Patented Dec. 22, 1953

2,663,650

UNITED STATES PATENT OFFICE 2,663,650

PROCESS FOR PREPARING COATED SILICA PARTICLES AND PRODUCT OBTAINED THEREBY

Ralph K. Iler, Cleveland Heights, Ohio, assignor to E. I. du Pont de Nemours & Company, Wilmington, Del., a corporation of Delaware No Drawing. Application June 15, 1949, Serial No. 99,355

5 Claims. (Cl. 106—308)

This invention relates to processes for the production of finely divided silica containing a surface-reacted long-carbon-chain nitrogen compound and to the products produced, and is more particularly directed to such processes in which an organic compound containing a chain of at least ten carbon atoms directly attached to nitrogen is added to an aqueous silica dispersion, the silica being made up of ultimate, dense particles having an average size of 15 to 130 millimicrons, whereby finely divided silica, surface-reacted with the organic nitrogen compound, is formed as a precipitate, and the precipitate is recovered as product, and is further directed to the thus-produced silica products in the form of pulverulent aggregates of substantially spherical, discrete, dense ultimate particles having an average diameter in the range of 15 to 130 millimicrons and being surface-reacted with the organic nitrogen compound.

It has been proposed in Kirk Patent 2,408,656 to separate polysilicic acid sols containing alcohols by salting out, and then to precipitate such sols with calcium chloride or magnesium chloride, the precipitate being used as a rubber filler. The product thus produced consists of porous silica gel, as is shown by the fact that it has a high internal surface area as determined by nitrogen adsorption. While the product functions as a filler for rubber, it contributes little if anything beneficial to the rubber properties. The strength, tear, modulus, and other rubber properties are not substantially improved. It has not hitherto been realized that the porous nature of the silica gel precipitate might be a disadvantage, nor that any desirable improvement could result from the provision, for use in rubber, of a silica product of low internal surface containing an organic nitrogen compound on its surface.

It is an object of this invention to provide processes for producing precipitates of finely divided silica having low internal surface. Another object is to provide processes which produce silica in the form of pulverulent aggregates of substantially spherical, discrete, dense ultimate particles. Another object is to provide processes whereby the yield of silica obtained in the form of finely divided particles is high. Another object is to provide processes for producing fine silica in a form in which it is useful for incorporation in rubber as a reenforcing filler. A further object is to provide processes in which the precipitation of silica particles from silica sols is facilitated by adding to the sols a long-carbon-chain nitrogen compound. A further object is to provide processes in which such precipitates are readily filterable. A further object is to provide fine silica, the individual particles of which are surface-reacted with such a long-chain nitrogen compound. Further objects will appear hereinafter.

The foregoing and other objects are accomplished according to this invention by processes comprising adding a long-carbon-chain nitrogen compound to an aqueous silica dispersion, the silica being made up of ultimate dense particles having an average particle size from 15 to 130 millimicrons, whereby finely divided silica, surface-reacted with the organic nitrogen compound, is formed as a precipitate, and recovering the precipitate as product; and are further accomplished by the thus-produced silica products in the form of pulverulent aggregates of substantially spherical, discrete, dense ultimate particles, substantially all of said ultimate prticles having an verage diameter in the range of 15 to 130 millimicrons and being surface-reacted with the organic nitrogen compound.

In describing this invention, when reference is made to a soluble silicate it will be understood that any soluble silicate may be used, that is, an alkali metal silicate, sodium or potassium being representative. The ordinary water glass of commerce, which is a concentrated sodium silicate solution having an $SiO_2:Na_2O$ weight ratio of 3.25:1 is suitable and preferred because of its low cost, but any ratio silicate from 1:1, that is metasilicate, to 3.9:1 may be used.

The silica dispersions to which organic nitrogen compound additions are made in a process of this invention may be prepared in a variety of ways. One is to react a hot solution of a silicate, such as sodium silicate, with acid, under suitable conditions. The silicate may be diluted and acid added until the pH is in the range from 8 to 11. The heating of the silica in this range stabilizes it by effecting a densification of the ultimate particles and thus provides the desired type of silica dispersion. Suitable silica dispersions may also be obtained from other types of silica sols by heating under proper conditions. The art is familiar with various ways of making silica sols. Methyl silicate may be hydrolyzed with water, as taught by Brimaux, Compt. rend, 98, 105 and 1434 (1884); silicon tetrachloride may be hydrolyzed with water—see Williams U. S. Patent 1,539,342; silicon sulfide may be hydrolyzed with water as taught by Fluery U. S. Patent 61,931; sodium silicate may be subjected to electro-osmosis as shown by Schwerin U. S. Patent 1,132,394; sodium silicate may be electrolyzed with a mercury cathode—see Collins U. S. Patent 1,562,940; or sodium ions may be removed from sodium silicate by ion-exchange resins as taught by Bird U. S. Patent 2,244,325 or Voorhees U. S. Patent 2,457,971.

It is important that, whatever the method used for making the sol, the sol obtained must be capable of being alkalized to the desired pH range without gelling.

Sols prepared by such methods as above-described, and heated to densify the ultimate particles therein, are suitable silica dispersions to which a long-carbon-chain nitrogen compound may be added according to the present invention. However, the size of ultimate silica particles may be close to the minimum required and it may be desired to build up the particles to a larger size. This can be done by adding to a heel of the heated sol additional quantities of reactive silica, such as silica freshly formed by neutralizing sodium silicate with an acid or abstracting sodium ions therefrom by means of an ion exchange resin. The use of a silica dispersion made up of ultimate particles built-up by such addition of acid and sodium silicate to a heel of densified silica constitutes a preferred embodiment of this invention and is described in detail below.

The concentration of the silicate and acid added to the silica sol to effect build-up is not critical. Obviously they must not be too dilute or the suspension of product obtained will require undue concentration. They should not be too concentrated for, especially in the case of the acid, it would be difficult to get thorough and instantaneous mixing of the acid with the reaction mixture. The concentrated sodium silicate solutions of commerce, containing up to 30 per cent silicate, could be used but it is better to dilute somewhat with water in order to facilitate mixing.

The concentration of salts in the heel of silica sol to which the acid and silicate are added is critical and should not exceed about 1.0 normal of alkali metal salt, since above this value gelation may occur. Alkali metal salt may be formed by the reaction of preparing the sol, as by reaction between sodium silicate and sulfuric acid, sodium sulfate being the salt formed. Additional quantities of salt are formed by the reaction of the acid and the silicate added to this heel.

The limitation on salt normality becomes even more important in conjunction with the silica content of the solution. Thus, with about 3 per cent silica in the solution the amount of salt which can be present is somewhat less than is the case when, say, 1 per cent of silica is present. For instance, if the feed is sodium metasilicate, it is preferred not to have more than about 1 per cent $SiO_2$ in the sol because of the larger amount of salt formed by the reaction.

The acid added to the silicate may be any acidulous material. It may be an aqueous solution, such as a solution of sulfuric or hydrochloric acid, it may be a gas, such as carbon dioxide, sulfur trioxide, sulfur dioxide, or hydrogen chloride, or it may be an acid-reacting material such as an acidic salt. When liquid acid solutions are used, especially with the stronger acids such as mineral acids, it is especially important to have quite violent mixing of the acid. In the case of gaseous acids, the gas may be diluted to assist violent admixing. Sulfamic acid may be used or such mineral acids as hydrobromic or nitric. Organic acids such as acetic, formic, lactic, and monochloroacetic may be employed. Hydrofluoric acid is not preferred, partly because of the extreme difficulty of handling it and of its extreme activity which would lead to local gelling. The acidulous salts, such as sodium bisulfate and sodium bisulfite can be used, but these are distinctly not preferred because they introduce salts and decrease the tolerance of salt in the system.

The manner of mixing the acid with the alkali silicate is quite important, but will be varied, depending on whether the acid is, say, an aqueous solution or a gas. With relatively concentrated aqueous solutions, it is desirable to have quite violent mixing of the acid solution and the silicate. In the case of gaseous acids, the gas may be diluted to assist violent admixing.

It is important to avoid local concentrations of acid. This may conveniently be done by adding the silicate at a fairly slow rate and dispersing it well through the system and then adding acid as a gas or in a fairly dilute state with vigorous agitation so as to avoid any local concentration of acid. Alternatively, the silicate and the acid are added to the heel simultaneously with intense agitation, as by passing them through a pipe with intense local mixing and thence into the heel. In another alternative, the sodium silicate is partially neutralized with acid until some 70 or 80 per cent of the alkali is neutralized and thereafter immediately there is added further quantities of acid and silicate. It is much preferred, however, to add the silicate and the acid separately to the relatively large volume of heel to prevent local concentration and possible gelling or gel formation.

The amount of acid used is such as to leave sufficient alkali in the mixture that the mixture will remain in the pH range from 8 to 11. Below pH 11 the silica is in a condition such that the particles can grow by the addition of further quantities of silica to them. Below pH 8 there is danger of gelling.

It is preferred to maintain a silica content in the heel of silica sol of from about ¼ per cent to 5 per cent of $SiO_2$.

The temperature of the heel is maintained above 60° C. during the build-up process. Preferably it is maintained between about 80 and 100° C. at atmospheric pressure, or at even higher temperatures at super-atmospheric pressures. The processes operate faster under pressure, that is, the build up of particles to the point where they may be precipitated by organic nitrogen compounds occurs in a shorter time, so that, under pressure, the time may even be cut down to ¼ of what is otherwise required at atmospheric pressure. When operating at atmospheric pressure, it is preferred to operate close to the boiling point, and if the boiling point is exceeded, water may be refluxed. The time and temperature are related; if the temperature is raised, the time is decreased, and vice versa. At 60° C. the time factor must be extended. The relation between time and temperature may be roughly estimated from the observation that the reaction rate doubles for about every 10° C. rise in temperature.

The time during which the addition of silicate and acid is continued will depend, of course, upon the temperature, and it can be determined visually by the point at which particles of $SiO_2$ grow to the size at which they cause the solution to become turbid. If the acid and silicate are added too fast they will set to a gel. This can be avoided by adding the silicate over a comparatively longer period of time. In the heel of sol originally present there are silica nuclei, and the incoming silicate adds to the nuclei already present. If sufficient time is not allowed for buildup to occur, that is, for the incoming nuclei to condense with the nuclei already present, there will either be new nuclei formed or there will be gelation.

The time of silicate addition at about 95° C. is of the order of several hours. About 1 hour is the minimum and times up to 8 hours have been used with great success.

The relation of the amount of silicate added to the volume of heel present is advantageously subjected to some control. The silica which acts as nuclei at the beginning of the process should amount to about 10 per cent of the total silica to be processed. In other words, one may start in the heel with sodium silicate equivalent to about 10 per cent of the total $SiO_2$, and after this is carefully neutralized the remainder may be added slowly. After this addition, the particles will be well up in the range from 15 to 130 millimicrons, and one may then continue the addition of silicate and neutralization until the particles are any desired size within the range. This will be about the size at which they can fairly readily be recovered by filtration after coagulation or agglomeration with an organic nitrogen compound.

The aqueous silica dispersion to which a long-carbon-chain nitrogen compound is added according to a process of this invention contains silica made up of ultimate, dense particles having an average size of from 15 to 130 millimicrons. The dispersion may be a stable sol in which the silica is present substantially as individual particles within the specified size range, or it may be merely a suspension or dispersion of aggregates or agglomerates of such ultimate particles. The latter type of dispersions may be obtained by effecting build-up of the ultimate particles as above described up to a size where the particles are about ready to precipitate, then adding a substantial amount of a precipitating agent such as an alkaline metal salt. For instance, build-up of silica on suitable nuclei may be effected by adding sodium silicate and carbonic acid and then increasing the normality of alkaline metal salt present above about 1.0. This has the tendency to gel any active silica present and cements together the built-up silica particles into aggregates which then come out of solution as a precipitate. The processes of this invention are applicable to aqueous suspensions of such precipitates.

The processes of this invention are also applicable to the precipitation of aqueous suspensions of reticulated silica products. Such reticulated products may be produced by processes in which aggregates consisting of a plurality of amorphous, dense ultimate silica particles at least 5 millimicrons in diameter, are mixed with an aqueous dispersion of active silica and the mixture is heated above 60° C. at a pH of 8 to 11, whereby the active silica accretes to the aggregates.

In the formation of silica precipitates surface-reacted with long-carbon-chain nitrogen compounds according to this invention there may be added to the silica dispersion any nitrogen compound in which a carbon chain containing at least ten carbon atoms is attached to a nitrogen atom. It is particularly preferred to use such a compound which is water-soluble. The compound may be one of the class known as long-chain amines, or may belong to the class of quaternary ammonium compounds. The amines may be mono-, di-, or tri-substituted, but in any event at least one of the substitutions on the nitrogen will be a long-carbon-chain. The amine may be a cyclic amine such as a pyridine derivative containing a long-carbon-chain. The quaternary ammonium compound may be a halide such as a chloride or bromide. It may also have a ring substitution, or the nitrogen may be part of a ring structure such as the pyridinium structure.

Representative of the long-chain amines which may be used are decyl, lauryl, stearyl, cetyl olelyl amines and representative of the quaternary compounds are cetyl trimethyl ammonium bromide, lauryl pyridinium chloride, lauryl trimethyl ammonium chloride and similar compounds.

In the novel silica products of the present invention the organic nitrogen compound is surface-reacted with the silica particles. The mechanism of this reaction is not entirely clear, but it is known that the organic nitrogen compound is tightly held on the surface of the individual silica particles as if by chemical reaction. Whether there is actual chemical reaction or whether the organic nitrogen compound is more loosely associated with the silica by a surface reaction mechanism, it is sufficient to say that it is not merely present on the silica particle by occlusion, because it is not thus easily washed out.

The amount of organic nitrogen compound used to react with the silica depends on the size of the silica particles, the concentration of silica in the aqueous dispersion and the pH of the dispersion. When the particles in a sol are anywhere near the right size for precipitation, or are already precipitated, they can be surface reacted by adding from about 0.5 to 5 per cent by weight of the organic nitrogen compound based on the weight of $SiO_2$ present, to an aqueous dispersion at a pH of about 9 containing upwards of 1 per cent by weight of silica. Conversely, the products so produced contain about from 0.5 to 5 per cent of the organic nitrogen compound. Larger or smaller amounts of organic nitrogen compound may be employed but ordinarily the amount will be in the range from $\frac{1}{10}$ to 10 per cent by weight based on the weight of $SiO_2$.

Generally, the amount of organic nitrogen compound to use varies inversely with the size of the ultimate silica particles in the dispersion so that as the particle size increases, the amount of organic nitrogen compound required decreases. Also, as the concentration of silica in the dispersion increases the concentration of organic nitrogen compound ion required decreases. The pH of the dispersion also influences the amount of organic nitrogen compound to use, the amount increasing as the pH is lowered. The pH should not be permitted to go too high—say, above about 11.0, because depolymerization of the silica tends to occur at higher pH values. A pH in the range from 8 to 11 gives satisfactory results, the range from 9 to 10.5 being especially preferred. In these ranges, with ultimate silica particles of 15 to 130 millimicrons diameter, and upwards of 1 per cent of silica in the dispersion, an amount of organic nitrogen compound equivalent to 5%, based on the weight of silica, will ordinarily be sufficient to effect surface-reaction to give a product of this invention. Lesser concentrations give correspondingly less coating of the silica particles or aggregates.

The products which are thus obtained are not actually individual particles, but, rather, are loose aggregates. The aggregates may be in the order of a micron or more in size, though the smaller aggregates are only a fraction of this. The ultimate particles which form the aggregates may vary from 15 to 130 millimicrons in size and are substantially spherical in shape. Even though the particles are aggregates they are still fairly free to separate upon some pressure and are fairly easily broken down under attrition. Thus, when the aggregates are added to rubber in a rubber compounding mill the aggregates are readily broken down to the ultimate, built-up particles or clusters made up of such particles.

The products are pulverulent in character, that is they are easily broken up by mild attrition into their ultimate particles. For instance, the products are easily incorporated into rubber by placing the dried filter cake of the product, after preliminary disintegration, in the rubber mill along with other compounding ingredients and milling in the usual manner.

The ultimate particles of silica containing the surface-reacted organic nitrogen compound coating are substantially spherical in shape and are discrete, in that the bonds between them which hold them into aggregates are relatively weak compared to the cohesive forces within the particle. The ultimate particles are dense, having low specific surface. This density may be shown by drying the particles and then determining the amount of nitrogen adsorption. From the nitrogen adsorption it may be determined that the particles have a surface area not greatly in excess of that computed for the particles as determined by actual observation from electron micrographs. It will be evident that if the particles are not dense but rather are porous then the apparent surface as determined by nitrogen adsorption will be much higher than that expected from the particle diameters. Nitrogen adsorption, accordingly, affords an easy measure of the density of the particles. The ultimate silica particles in a product of the present invention have a density such that the surface area as determined by nitrogen adsorption is not greatly in excess of that computed for the particle size as determined by examination of an electron micrograph and the adsorption should not be more than about 30 per cent greater than that computed from the apparent particle size.

The method of determining the surface area by nitrogen adsorption is described in "A New Method for Measuring the Surface Areas of Finely Divided Materials and for Determining the Size of Particles" by P. H. Emmett in "Symposium on New Methods for Particle Size Determination in Subsieve Range" in the Washington Spring meeting of ASTM, March 4, 1941.

The novel products of this invention are useful for a variety of purposes. Products in the higher particle size range, that is, running up to 130 millimicrons diameter, are found useful for rubber fillers for reenforcing, while products in the lower range, that is down to 15 millimicrons diameter, are quite interesting for incorporation in paper, plastics, and in paints as flatting agents, and for other similar uses.

The invention will be better understood by reference to the following illustrative examples.

*Example 1*

A silica slurry was prepared by reacting $CO_2$ with sodium silicate $$\left(\frac{SiO_2}{Na_2O}=3.25\right)$$

so that a "heel" was made in 45 minutes by adding $CO_2$ to the sodium silicate batch until the $$\frac{CO_2}{Na_2O}$$

ratio was 1.15. At the end of 45 minutes, $CO_2$ and sodium silicate were then added over a 3 hr. period so that the ratio of $$\frac{CO_2}{Na_2O}$$

was held at about 1.15, and the pH was about 10.3 during this period. The ratio of $$\frac{\text{sodium silicate added after heel manufacture}}{\text{sodium silicate in the heel batch}}$$

was 4. The reaction was carried out at 90–100° C.

The silica in the slurry was precipitated by adding 2% of stearyl dimethyl amine as a coagulant. The coagulant was added to the silica slurry at 60° C.–70° C. with agitation. The slurry was allowed to coagulate at 50–70° C. for 1½ hours and then filtered on a filter test leaf at 60–70° C. The filtration rate was observed to be a measure of the precipitation characteristics and was found to be 104 as compared with 35 for the control.

*Example 2*

In place of the coagulant used in Example 1, 2% by weight of "Arquad C," a mixture of octyl, decyl, dodecyl, tetradecyl, hexadecyl, octadecyl, and octadecenyl trimethyl ammonium chlorides was used. The filtration rate of the coagulated precipitate was 153.

*Example 3*

In the silica slurry of Example 1, 2% of a mixture containing 33% of stearyl trimethyl ammonium bromide was used. The filtration rate of the coagulated precipitate was 144.

*Example 4*

In the silica slurry of Example 1, 2% of a mixture containing 25% of stearyl dimethyl amine oxide was used. The filtration rate of the coagulate precipitate was 100.

*Example 5*

In the silica slurry of Example 1, 0.75% of "LAN Retarder," a mixture containing 20% of a mixture of cetyl and dodecyl trimethyl ammonium bromides, was used. The filtration rate of the coagulated precipitate was 90.

I claim:

1. A composition comprising silica in the form of pulverulent aggregates of substantially spherical, ultimate particles, the composition being substantially identical with the product produced by a process including the steps of building up the size of ultimate silica particles in an aqueous silica sol by adding reactive silica thereto at a pH of 8 to 11 and a temperature of about 60 to 100° C., the reactive silica being freshly prepared by neutralizing sodium silicate with an acid, until the particles in the sol are in the size range of 15 to 130 millimicrons, the particles being so dense that their surface area as determined by nitrogen adsorption is not more than about 30 per cent greater than their surface area as computed from the apparent particle size determined from an electron micrograph of the particles, and mixing in solution in the sol of built-up particles an organic nitrogen compound having a carbon chain of at least 10 carbon atoms in the proportion of about from 0.1 to 10.0 per cent by weight, based on the silica, whereby the silica is precipitated.

2. In a process for producing finely divided silica having a coating of an organic nitrogen compound so tightly held on the surface thereof that it is not removed by washing with water, the steps comprising building up the size of ultimate silica particles in an aqueous silica sol by adding reactive silica thereto at a pH of 8 to 11 and a temperature of about 60 to 100° C., the reactive silica being freshly prepared by neutralizing sodium silicate with an acid, until the particles in the sol are in the size range of 15 to 130 millimicrons, the particles being so dense that their surface area as determined by nitrogen adsorption is not more than about 30 per cent greater than their surface area as computed from the apparent particle size determined from an electron micrograph of the particles, and mixing in solution in the sol of built-up particles an organic nitrogen compound having a carbon chain of at least 10 carbon atoms in the proportion of about from 0.1 to 10.0 per cent by weight, based on the silica, whereby the silica is precipitated.

3. In a process for producing finely divided silica having a coating of an organic nitrogen compound so tightly held on the surface thereof that it is not removed by washing with water, the steps comprising building up the size of ultimate silica particles in an aqueous silica sol by adding reactive silica thereto at a pH of 8 to 11 and a temperature of about 60 to 100° C., the reactive silica being freshly prepared by neutralizing sodium silicate by removing sodium ions therefrom with the hydrogen form of an ion exchange resin, until the particles in the sol are in the size range of 15 to 130 millimicrons, the particles being so dense that their surface area as determined by nitrogen adsorption is not more than about 30 per cent greater than their surface area as computed from the apparent particle size determined from an electron micrograph of the particles, and mixing in solution in the sol of built-up particles an organic nitrogen compound having a carbon chain of at least 10 carbon atoms in the proportion of about from 0.1 to 10.0 per cent by weight, based on the silica, whereby the silica is precipitated.

4. In a process for producing finely divided silica having a coating of an organic nitrogen compound so tightly held on the surface thereof that it is not removed by washing with water, the steps comprising building up the size of ultimate silica particles in an aqueous silica sol, by adding reactive silica thereto at a pH of 8 to 11 and a temperature of about 60 to 100° C., the reactive silica being freshly prepared by neutralizing sodium silicate with an acid until the particles in the sol are in the size range of 15 to 130 millimicrons, the particles being so dense that their surface area as determined by nitrogen adsorption is not more than about 30 per cent greater than their surface area as computed from the apparent particle size determined from an electron micrograph of the particles, mixing in solution in the sol of built-up particles an organic nitrogen compound having a carbon chain of at least 10 carbon atoms in the proportion of about from 0.1 to 10.0 per cent by weight, based on the silica, whereby the silica is precipitated, and recovering the precipitate as product.

5. In a process for producing finely divided silica having a coating of an organic nitrogen compound so tightly held on the surface thereof that it is not removed by washing with water, the steps comprising building up the size of ultimate silica particles in an aqueous silica sol, by adding reactive silica thereto at a pH of 8 to 11 and a temperature of about 60 to 100° C., the reactive silica being freshly prepared by neutralizing sodium silicate by removing sodium ions therefrom with the hydrogen form of an ion exchange resin until the particles in the sol are in the size range of 15 to 130 millimicrons, the particles being so dense that their surface area as determined by nitrogen adsorption is not more than about 30 per cent greater than their surface area as computed from the apparent particle size determined from an electron micrograph of the particles, mixing in solution in the sol of built-up particles an organic nitrogen compound having a carbon chain of at least 10 carbon atoms in the proportion of about from 0.1 to 10.0 per cent by weight, based on the silica, whereby the silica is precipitated, and recovering the precipitate as product.

RALPH K. ILER.

References Cited in the file of this patent

UNITED STATES PATENTS

| Number | Name | Date |
| --- | --- | --- |
| 2,276,314 | Kirk | Mar. 17, 1942 |
| 2,392,767 | Robinson | Jan. 8, 1946 |